3,574,801
METHOD FOR MAKING PANELS OF THE ARTIFICIAL STONE-TYPE
Georg Jauker, Bologna, Italy, assignor to
Repla SA, Lugano, Switzerland
No Drawing. Filed Sept. 30, 1968, Ser. No. 763,913
Claims priority, application Switzerland, Dec. 6, 1967,
17,159/67
Int. Cl. B28b 1/08, 1/16
U.S. Cl. 264—37                                                    7 Claims

ABSTRACT OF THE DISCLOSURE

Method of making panels of the artificial stone-type from conglomerates of synthetic resins and granulates, particularly granite and marble wherein the resins are catalyzed, the granulates are added thereto and homogenized, a mold is filled with the homogenized mass at normal working temperatures, the mold is vibrated, an excess of quartz sand is distributed over the back side of the panel, the mold is passed through a polymerization tunnel, the flash is removed, the mold is cooled and the panel is removed from the mold.

---

This invention relates to an improved method for producing artificial stone-type panels and relates more particularly to the production of such articles from a conglomerate of granulates, particularly of granite and marble, with synthetic resins.

The prior art recognizes various techniques for producing bodies consisting of synthetic resin conglomerates wherein the additives perform the function of a filler.

In all of these prior art techniques the fillers which are recommended as additives are always selected from a particular group, such as, for example, glass fibers, asbestos, calcium carbonate, cellulose flakes, cinder, silicates, metal powders, quartz, barite, kaolines, gypsum and so forth, which additives are known to behave in such manner as to avoid all side effects. At most, these materials influence the mechanical properties of the end products, depending upon the particular type of additive used.

The substances or products which can be produced with these additives can be processed in a variety of ways. Particularly important are such products wherein the additives are added to liquid synthetic resins and thus form a dough-like, more or less, coherent mixture which can be cast or formed. Inasmuch as additives of neutral properties which will not produce gases or other side effects are utilized in all of these prior art synthetic resin conglomerates, there results a faultless and excellent polymerization. In this connection, the quantity of the additives used can vary within a wide range; they function to keep the product together in a continuous manner and a further result of their use is that the stresses or tensions caused by the synthetic resins are relieved.

The combination of synthetic resins with granite or marble granulates represents a special group of substances which are used as building materials for floor and wall coverings, reproducing most exactly the color tones and appearance of the respective types of stone.

The materials of the last-mentioned group are processed in various ways. According to one technique, the material is poured into molding boxes, with or without jarring or vibration, thus forming blocks which may subsequently be sawed apart by means of conventional equipment. The panels which are thus produced are always of small dimensions and, in each instance, are polished or ground on one side of their surface.

According to another technique, the material is poured into molds possessing predetermined dimensions which, previously thereto, have been treated with a release agent. A vibration operation takes place simultaneously with such process. As in the casting into blocks, here also it is possible to produce only small, thick panels whose largest dimensions are approximately 40 by 80 cm.

In every instance, with prior art techniques using these materials, the viewing surface must be polished. This is done not only in order to provide it with a more pleasing appearance, but primarily, in order to minimize or compensate the curvature of the panel which is practically always present with such procedures and which is caused by the stress or tension of the bonding agent.

It is therefore understandable that, as a result of these not very satisfactory processes, further efforts have been made in order to improve the production techniques. Thus, a method became known which involves pressing operations utilizing as the material a conglomerate with a low percentage of polyester resins. The material emerging from a mixer is placed into molds which have been preheated to about 100° C. After vibration and thorough mixing of the material for a predetermined time, a similarly pre-heated cover or lid is placed upon the molds. The mold is then placed into a press device before it reaches the polymerization oven.

This method has attained certain importance. However, the required prerequisites for its success are manifold and moreover, involve substantial costs. Before the granulates are used, they must be exposed to a heat treatment whose time limitation cannot always be predetermined. One reason for this heat treatment is to eliminate the moisture which accumulated during the crushing and storing operations and the second reason is to separate out volatile organic or water components which might occur as a result of temperature fluctuations apppearing during the course of the manufacturing process. As is known, there are always certain substances in granite and marble—these minerals being of eruptive, sedimentary and metamorphic origin—which are not always compatible with polyester and isophthalic resins when considering the temperatures required for quick and complete polymerization. If these substances, for example, carbon or sulphur as they exist in a free state or in compounds, are not previously eliminated, then they cause a number of defects such as craters, cracks, bubbles, etc. The same defects are incidentally also caused by vapor emanating from moisture which may remain with the material. This makes it increasingly difficult to lift the panel from the mold, often resulting in fractures.

A further prerequisite in such prior art procedures is the low content of synthetic resin. This might be considered to be an advantage insofar as economics is concerned. However, this prerequisite makes it necessary to prevent, during vibration, any excessively sharp separation between the granulates which tend to sink and the synthetic resins which always strive to emerge to the surface.

Moreover, this phenomenon makes de-gassing more difficult and, additionally, the tensile stress in the free synthetic resin layer causes the panel to bend. It has been found that an increase in the content of the synthetic resin portion would cause the panel to bend even more. The low synthetic resin content moreover imparts to the panels a stiffness and brittleness which substantially limits their use in the construction field.

Furthermore, the mass is not sufficiently bonded because of the low synthetic resin content, whereby its uniform deposit into the mold or matrix is made more difficult, so that it is often necessary to manually assist by using smoothing trowels or the like.

Although the last-described method is suitable for producing artificial stone-type panels, and although it also has attained a certain importance, it still must not be overlooked that there are relative narrow limits concerning the size and thickness of the panels which can be manufactured with such techniques, thereby limiting their utilization. This limitation in the use of these panels is caused, on the one hand, by the difficulties attendant to the production and, on the other hand, by reason of the high costs of the equipment and the resulting high costs of the final product. In addition thereto, one must consider that the placement or offsetting of the resulting panels is difficult inasmuch as neither cement nor adhesives customarily employed in the construction trade can be used. It is necessary that polymeric adhesives be used with such panels which not only are very expensive, but which also require expert personnel for their application so that the savings, as compared to the use of natural stone, are insignificant.

It is, therefore, a primary object of this invention to obviate the aforementioned drawbacks and in particular to overcome the limitations inherent in presently utilized techniques. The method of the instant invention is characterized by homogenizing the synthetic resin with a catalyst and a granulate having a precise predetermined grain size in a mixer. The homogenized mass is then filled into a mold which is kept at room temperature. Thereupon, it is vibrated. Prior to placing the mold into the polymerization oven, quartz or silica sand having a certain granule or grain size is applied in excess to the surface which is to be the back side of the panel.

Thus, among the objects of this invention, are the provision of techniques for the production of artificial stone-type panels which:

(1) Avoid the laborious and expensive heat treatment of the granulates of the prior art and, in contrast, uses the granulates in their original state;

(2) Avoid having to work with only a low content of synthetic resins in manufacturing the panels, but rather permits the use of quantities of resin which assure, not only sufficient saturation or satiation, but even a slight excess;

(3) Avoid placing the masses into molds which are equipped with a lid, thus assuring satisfactory de-gassing, also with mixtures which possess components which are volatile at manufacturing temperatures or mixtures which have a relatively high moisture content; and (4) Permit an economical and effortless affixation of the panels onto any base material, that is, without having to resort to special adhesives, but permitting the use of more conventional adhesives or means.

The basic techniques of this invention comprise the following steps:

(1) Catalyzing the polyester resins in the mixer;

(2) Adding the granulates having precise predetermined grain or particle sizes;

(3) Homogenizing the mass in the mixer whereby the mass resulting therefrom is compact and not coherent;

(4) Filling the mold by a casting process using normal working temperatures of from 18° C. to 30° C.;

(5) Distributing the mass in the mold and subsequently vibrating the filled mold in order to eliminate the air enclosed within the mass as well as the air which remains stuck to the blank surface of the mold, and also to initiate the de-gassing step and assure uniform distribution;

(6) Distributing $SiO_2$ as quartz sand on the back side of the panel by means of a vibrating screen, the quantity thus distributed being applied with a good deal of excess in order to make absolutely certain that every part of the surface area is covered following which the excess of the quartz sand is retrieved by means of a suction device and is then re-introduced into the distribution process;

(7) Transferring the matrix or the mold into a polymerization tunnel which operates at a temperature of 120° C. to begin the polymerization phase of the mass during the course of which de-gassing takes place gradually and completely, the forced air circulation eliminating air and gases of every origin and eliminating their accumulation at the surface of the mass since it is known that such accumulation causes the danger of a renewed absorption with the additional feature that controlling the separated waste gases enables surveillance of the process which takes place in a predetermined time sequence of about 20 minutes;

(8) Eliminating the flash caused by the slight excess of the mass at the mold frames and simultaneously retrieving the excess silicic acid;

(9) Transferring the mold with what is now the polymerized panel into a cooling tunnel where the matrixes are again brought back to their initial temperature, i.e., from about 120° C. down to about 18° to 30° C., the importance of this step not necessitating emphasis since it is obvious that at polymerization temperatures of 120° C. all further processing of the panels would otherwise result in their being deformed; and

(10) Lifting the panel which operation can take place effortlessly either manually or with mechanical means.

As compared with the conventional methods, the method herein has the advantage of utilizing a number of relatively simple steps. This makes it possible to manufacture panels having dimensions which are substantially larger than those which could be manufactured heretofore. For example, it is possible to manufacture panels having dimensions of 300 by 120 cm. as are commonly utilized in modern prefabricated elements. Moreover, it is possible to manufacture panels of even larger dimensions in the event that new standardized and prefabricated elements should require this. The average thickness of the panel is 6 mm. and the average weight per square meter is approximately 12 kg. which corresponds to 43.2 kg. in a format of 300 by 120 cm.

One further advantage is that the typical properties of such panels are completely retained or are even improved in that panels manufactured according to the techniques of this invention have:

High resistance to wear and tear; high abrasion resistance; good weather-resisting properties against frost as well as ultra-violet and infrared rays; good resistance to the effects of corrosive acids as well as oil and fatty matters; non-combustibility; are not subject to attack by mold fungus; have indestructible color tones; are non-deformable even during extended periods of time; are vapor-permeable; and assure good heat transfer between interior and exterior rooms.

However, of particular importance is the great flexibility and elasticity as well as the high impact strength of the panels manufactured according to the process of this invention which can adapt themselves in every respect to every type of deformation caused by external loads. As a result thereof, such panels are suitable for exterior as well as interior paneling of all prefabricated construction elements, even in those cases where they are exposed to particularly high demands during their processing or preparation as well as during transportation and placement.

The processing or preparation of these panels is easy: they can be sawed through, bored through, milled, beveled, and so forth, and these various operations can be performed with tools customarily used in paneling work. Placement of these panels can be performed equally simply by using standard cements or adhesives customarily used in the construction business.

For a better understanding, an artificial stone-type panel manufactured according to the inventive method will be now described.

EXAMPLE

The polyester resins described as (A) and (B) which have been used in this case are products of the firm of Bombrini-Parodi-Delfino, Rome, Italy, and are being sold under the trade designation "Selectron 5003" (A) and "Selectron 5220" (B), the "Selectron" 5000 series of resins being clear, transparent, fast-curing thermosetting, polyester resins of the copolymer type.

The composition of the mineral additives exhibit the following granular structures or particle sizes:

Initially, the marble and granite fractional pieces or fragments are ground in a jaw crusher. The resulting fragments are then screened by means of four different sizes of screens through which the four basic grain or particle sizes are obtained.

Granulate or grain size No. 1 consists of the entire fine-particled matter or fragments which passes through a square mesh screen having 80 openings/inch. This fine-particled matter thus ranges from fly-dust to the maximum material which can penetrate the screen.

Granulated or grain size No. 2 consists of the remainder of the fine-particled matter or fragments No. 1 after sifting the same through a 30 opening/inch square mesh screen. The particled matter or fragments thus comprises all granular sizes between 80 and 30 mesh/inch.

Granulate or grain size No. 3 is the remainder of the particled matter or fragments No. 2 after sifting through a square mesh screen having 2.5 mm. mesh size.

Granulate or grain size No. 4 is the resulting remainder of particled matter or fragments No. 3 after sifting the same through a square mesh screen having 4 mm. mesh size.

Hence, the entire particled matter or fragments produced by the jaw crusher are being used up to a granular size of 4 mm. mesh size.

The percentages described below refer to the total weight of the finished panel:

8.25 percent synthetic resin A and 8.25 percent synthetic resin B are fed into a mixer, whereupon at the beginning of the mixing operation, 0.017 percent of a catalyst of the benzoyl peroxide type mixed with 50 percent tricresylphosphate is added and mixed thereafter. 66.817 percent of untreated mineral additives are then added to this catalyzed mixture, whereupon the whole mass is thoroughly mixed further.

Thereupon the thoroughly homogenized mass is put into the mold which is kept at room temperature (about 18° C. to 30° C.), that is, it is not particularly heated up, whereupon the mass is vibrated for 2 minutes.

At this stage there is added the $SiO_2$ as quartz sand. This natural quartz sand is one from sea deposits which by virtue of their geological origin have certain physical, in particular granulometric, properties and certain crystallographic shape. The quartz sand used has a granular size of from about 0.6 to 1.0 mm.

The addition of the quartz sand saturates or satiates the excess of the synthetic resins which have emerged to the surface as a result of the vibration. At the same time, this additive, by virtue of its special structure, not only breaks up the tension or stress of the synthetic resin chains, but it also assures the filling up of the voids or interstices which may have remained empty so that an ideal continuity with the underlying mixture is guaranteed. Moreover, the sandy surface structure forms on the back side of the panel which enables placing the panel onto any desirable base material using any conventional adhesive.

The quantity of conglomerated quartz sand which remains amounts to 16.666 percent of the total weight.

The subsequent work phases or steps correspond to the operations listed in points 7 to 10 during the description of the production method hereinabove.

The composition of one kg. of the material used for the production of artificial stone-type panels is, thus, as follows:

TYPE—GRANITE AND MARBLE

Thickness: 6 mm.

| | Percent |
|---|---|
| Resins | 16.500 |
| Catalyst | 0.017 |
| Granulate | 66.817 |
| Quartz sand | 16.666 |
| Total | 100.000 |

The following quantities of material are required per square meter of such panel:

TYPE—GRANITE AND MARBLE

Thickness: 6 mm.

| | Kg. |
|---|---|
| Resins | 1.98 |
| Catalyst | 0.020 |
| Granulate | 8.00 |
| Quartz sand | 2.00 |
| Total | 12.000 |

Thus, it can be seen that the weight ratio of resin to granulate is approximately 1–4.

The panels manufactured with this composition possess the following advantages:

(1) Low weight per square meter of final product and correspondingly low load upon the support structures:

(2) Production of large dimensional formats and, thus, the possibility for applying the panels on prefabricated construction elements when the same are manufactured as well as directly at the construction site;

(3) Exact reproduction of the respective natural stone in appearance as well as in color tone;

(4) Low costs for the production equipment and the raw materials used in connection therewith enabling the marketing of a finished product which is substantially cheaper than the corresponding natural stone types;

(5) In view of the low weight of the finished product, the panels can be placed easily without requiring metal anchors or tie rods and by using customary cements and adhesives;

(6) Due to the great elasticity, the panels can also be placed on old floors, thus providing a means for the renovation or modernization of old buildings; and (7) Due to their low weight, the panels can also be used in ship building.

The listed numerical values are tested or proven values from which it is possible to deviate to a certain extent without at the same time departing from the inventive method and the product manufactured pursuant thereto. Thus, other polymerizing synthetic resins, as well as other components of the compositions, can be used. Likewise, the granular or particle sizes permit certain deviations as long as the mentioned properties of the panels are retained.

Having now described the instant inventive concepts in detail, what is claimed is:

1. A method for producing artificial stone-type panels from a conglomerate of granulates, particularly granite and marble, with synthetic resins, comprising:
   (a) feeding the synthetic resins with a catalyst therefor into a mixer;
   (b) adding the granulate of precise predetermined granular sizes of 4 mm. mesh size and smaller thereto, the weight ratio of said resins to said granulate being approximately 1–4;

(c) homogenizing the thus-produced mass in the mixer;
(d) pouring the homogenized mass into a mold kept at room temperature;
(e) vibrating said mold to eliminate entrapped gases;
(f) applifying an excess of quartz sand to the surface which is to form the back side of the panel, thereby ensuring that the entire surface of said back side is covered with said sand;
(g) removing the excess of said sand;
(h) placing said mold into a polymerization oven; and
(i) removing said mold from said oven after a predetermined length of time in order for the material to cure.

2. The method of claim 1, wherein said resins are polyester resins.

3. The method of claim 1, wherein said mold is a lidless mold.

4. The method of claim 1, wherein the polymerization is performed for about 20 minutes at approximately 120° C. in an oven equipped with forced circulating air ventilation.

5. The method of claim 1, wherein the vibration of the homogenized mass takes place for about two minutes.

6. The method of claim 1, wherein the excess quartz sand is removed by means of a suction device after polymerization and then re-introduced for renewed use.

7. The method of claim 1, wherein the quartz sand has a granular size of from about 0.60 to 1.00 mm.

References Cited
UNITED STATES PATENTS

| | | | |
|---|---|---|---|
| 3,378,617 | 4/1968 | Elmendorf | 264—256 |
| 3,371,135 | 2/1968 | Goodwin | 264—71 |
| 3,419,454 | 12/1968 | Hoffman | 264—256 |
| 3,450,808 | 6/1969 | Roberts | 264—271 |

ROBERT F. WHITE, Primary Examiner

R. SHEAR, Assistant Examiner

U.S. Cl. X.R.

264—71, 256